US012677080B2

(12) United States Patent
Nakajima

(10) Patent No.: US 12,677,080 B2
(45) Date of Patent: Jul. 7, 2026

(54) TIME TO DIGITAL CONVERTER, DISTANCE MEASURING DEVICE, AND MOVING BODY

(71) Applicant: CANON KABUSHIKI KAISHA, Tokyo (JP)

(72) Inventor: Yuji Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 18/893,507

(22) Filed: Sep. 23, 2024

(65) Prior Publication Data

US 2025/0113115 A1      Apr. 3, 2025

(30) Foreign Application Priority Data

Sep. 29, 2023      (JP) ................................. 2023-170870

(51) Int. Cl.
H04N 25/772 (2023.01)
G04F 10/00 (2006.01)

(52) U.S. Cl.
CPC ......... H04N 25/772 (2023.01); G04F 10/005 (2013.01)

(58) Field of Classification Search
CPC ............................ H04N 25/772; G04F 10/005
See application file for complete search history.

(56) References Cited

U.S. PATENT DOCUMENTS

| | | | | |
|---|---|---|---|---|
| 8,629,694 | B1 * | 1/2014 | Wang ................. | H03K 19/0008 327/24 |
| 2010/0128248 | A1 | 5/2010 | Heizmann | |
| 2013/0052972 | A1 * | 2/2013 | Gossmann ............ | H04L 27/361 455/115.1 |
| 2016/0246262 | A1 * | 8/2016 | Liu ......................... | H03M 1/50 |
| 2021/0063451 | A1 * | 3/2021 | Takahashi .............. | G01R 23/10 |
| 2023/0370746 | A1 * | 11/2023 | Ozawa .................... | H03M 1/34 |
| 2024/0048872 | A1 | 2/2024 | Nakajima | |
| 2024/0142584 | A1 * | 5/2024 | Maierbacher ........... | G01S 7/526 |

(Continued)

FOREIGN PATENT DOCUMENTS

| | | |
|---|---|---|
| JP | H10-10248 A | 1/1998 |
| JP | 2012-242352 A | 12/2012 |

(Continued)

OTHER PUBLICATIONS

U.S. Appl. No. 18/826,465, filed Sep. 6, 2024 by Satoru Mikajiri.

*Primary Examiner* — Jason A Flohre
(74) *Attorney, Agent, or Firm* — VENABLE LLP

(57) ABSTRACT
A time to digital conversion circuit includes a first measurement block and one or a plurality of second measurement blocks. The first measurement block activates a control signal in accordance with activation of a start signal and measures time from the activation of the start signal to a first edge of a common clock signal. The second measurement block includes a lower measurement circuit and an upper measurement circuit, which are enabled by the activation of the control signal. The lower measurement circuit measures time from activation of a stop signal to a second edge of the common clock signal, and the upper measurement circuit measures time from the first edge to the second edge.

16 Claims, 15 Drawing Sheets

(56) References Cited

U.S. PATENT DOCUMENTS

| | | | | |
|---|---|---|---|---|
| 2024/0231283 A1* | 7/2024 | Kuo | .................. | G04F 10/005 |
| 2024/0411273 A1* | 12/2024 | Chen | .................. | G04F 10/005 |

FOREIGN PATENT DOCUMENTS

| | | |
|---|---|---|
| JP | 2022-080155 A | 5/2022 |
| JP | 2023-133093 A | 9/2023 |
| WO | 2013/034770 A2 | 3/2013 |

* cited by examiner

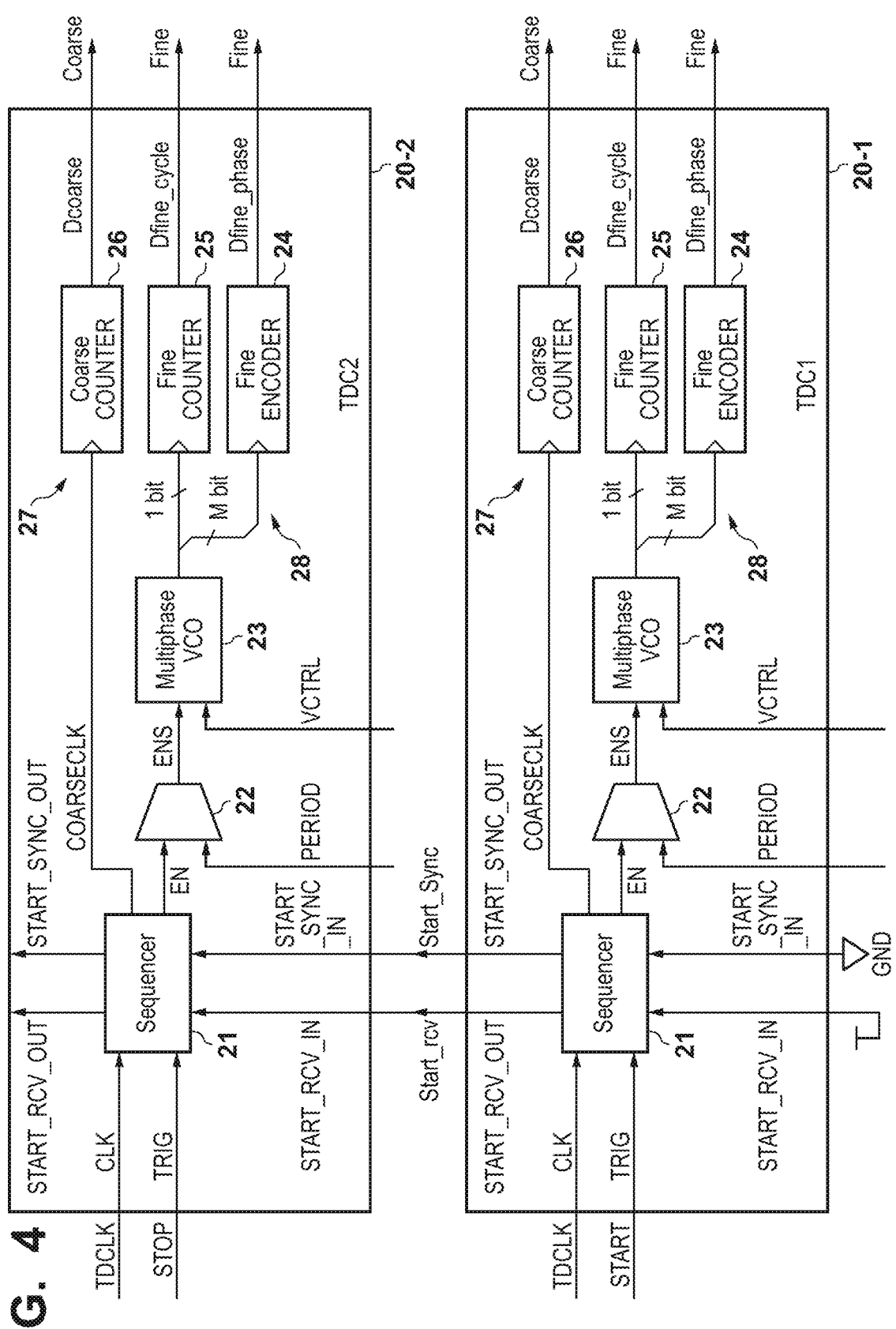
F I G. 4

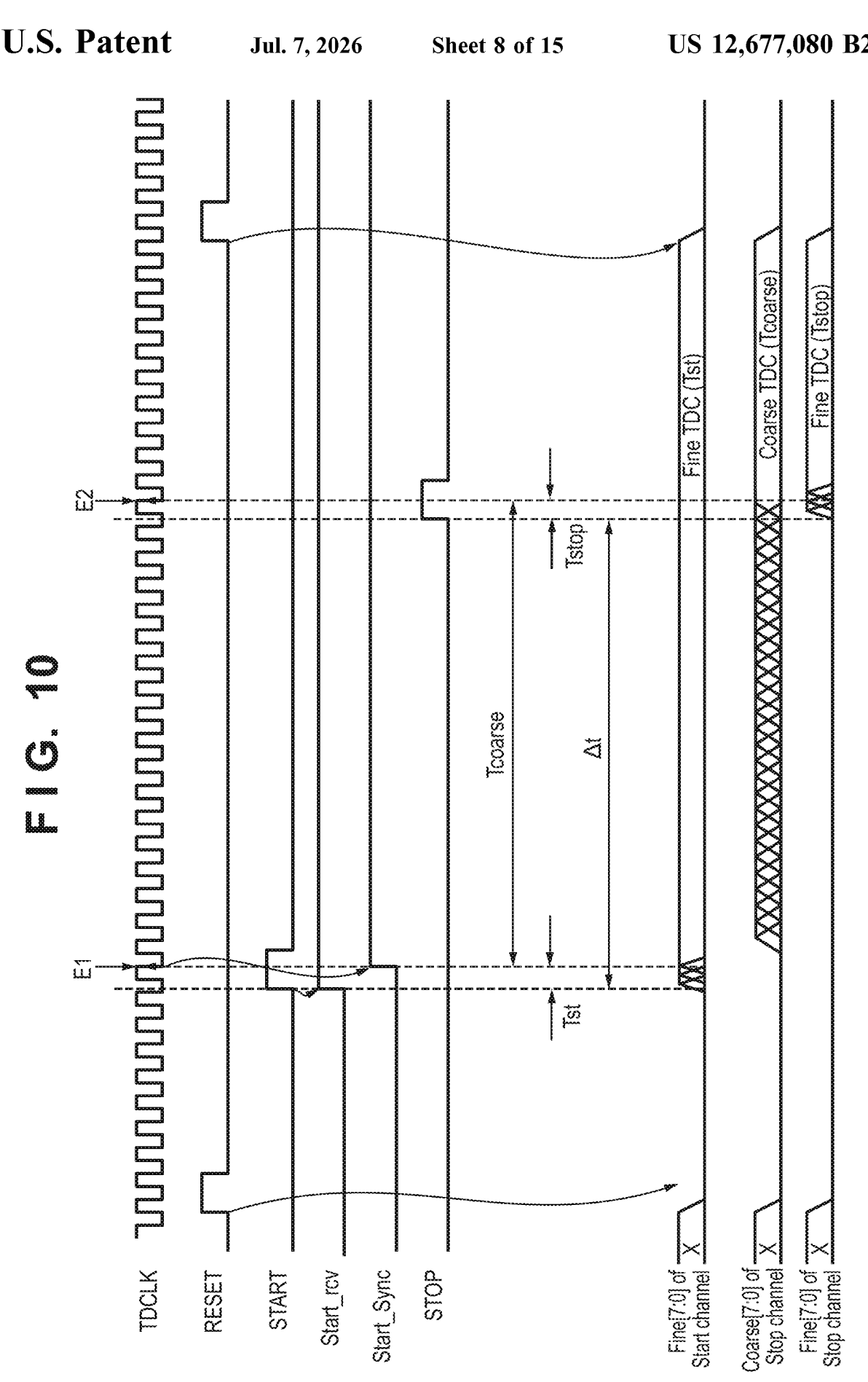
F I G. 10

F I G. 11
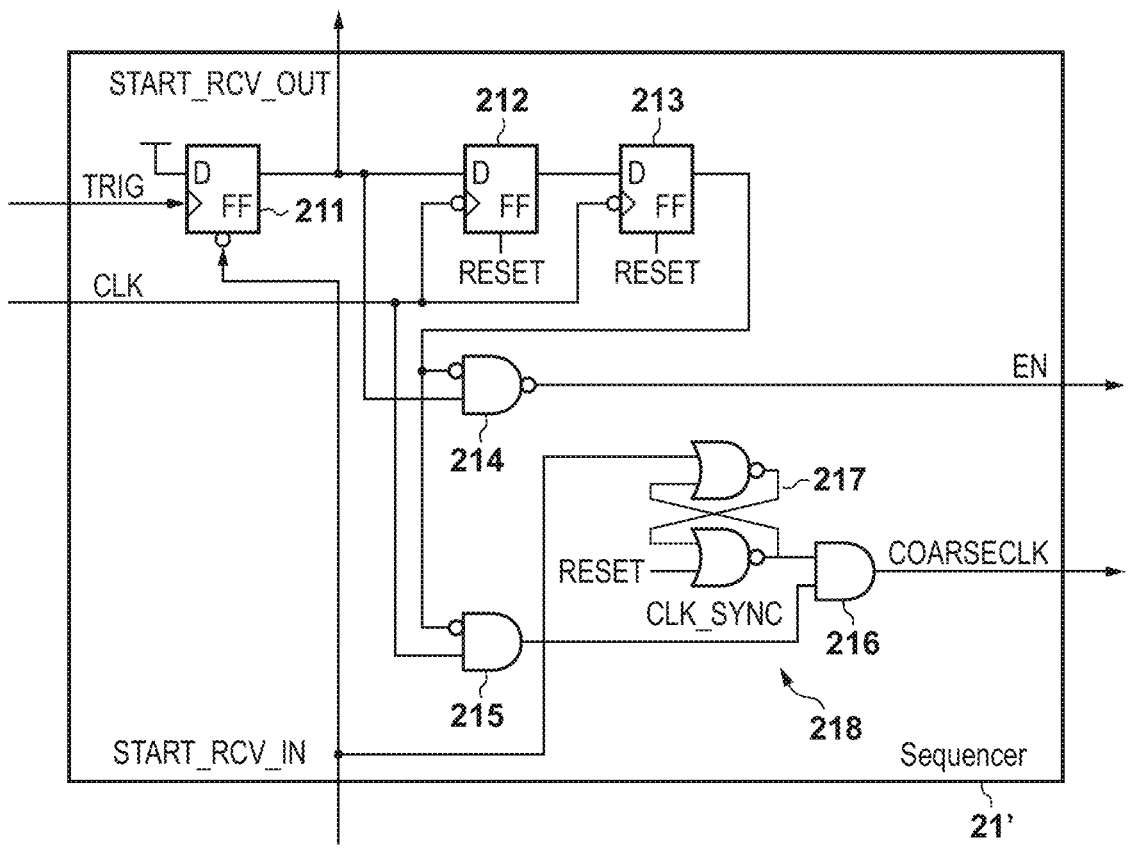

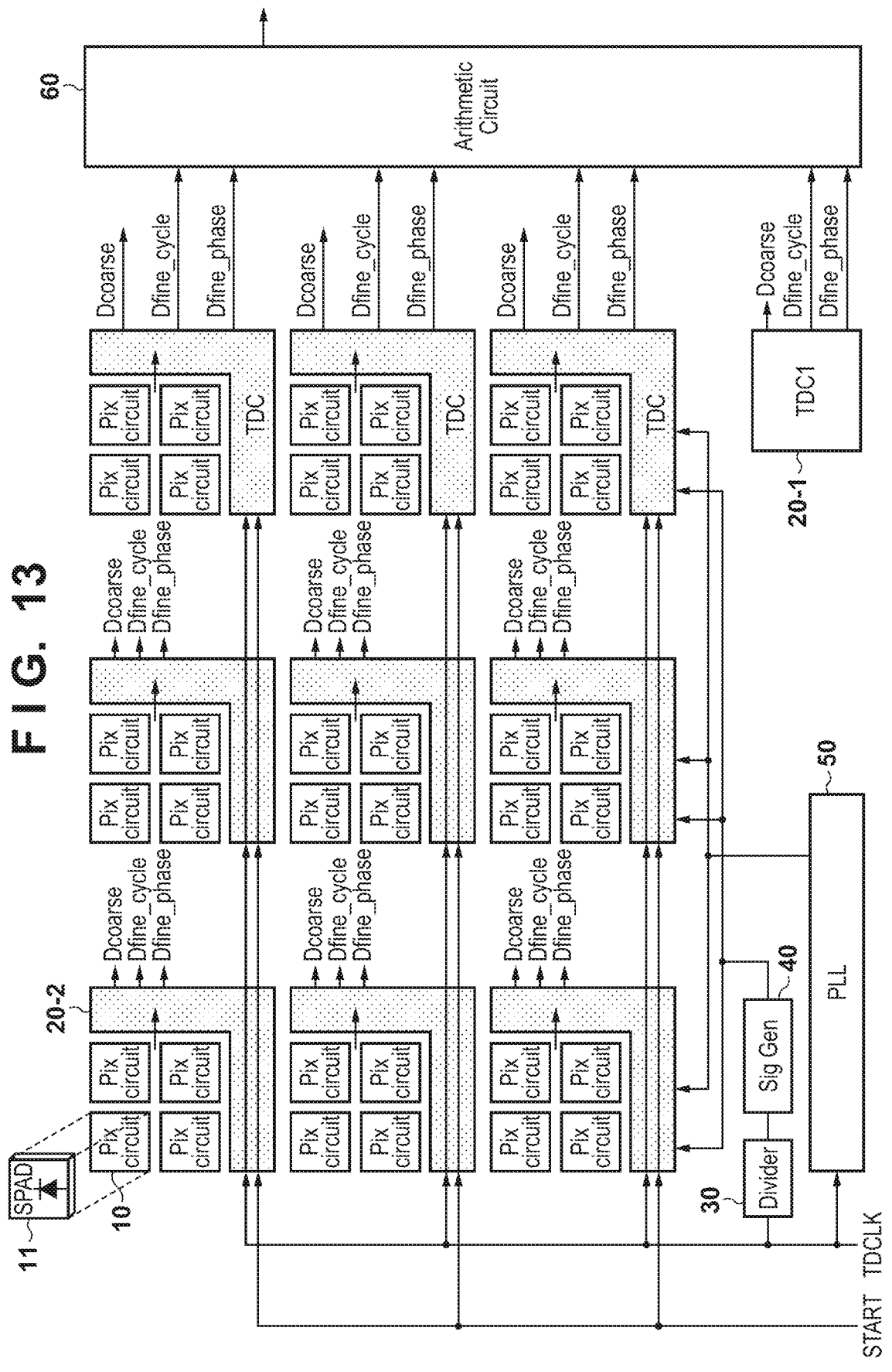
F I G. 13

F I G. 14
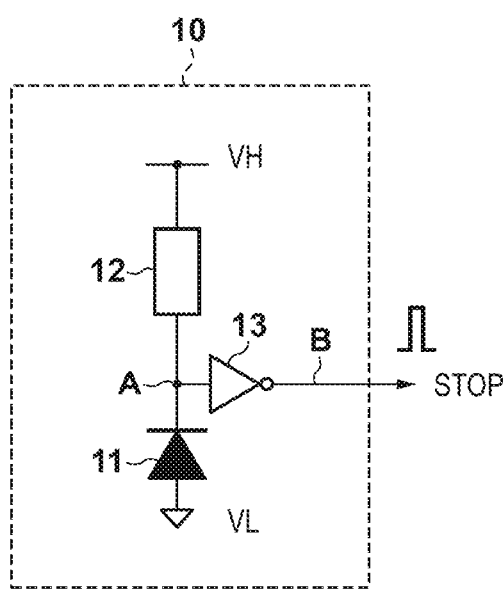

F I G. 16
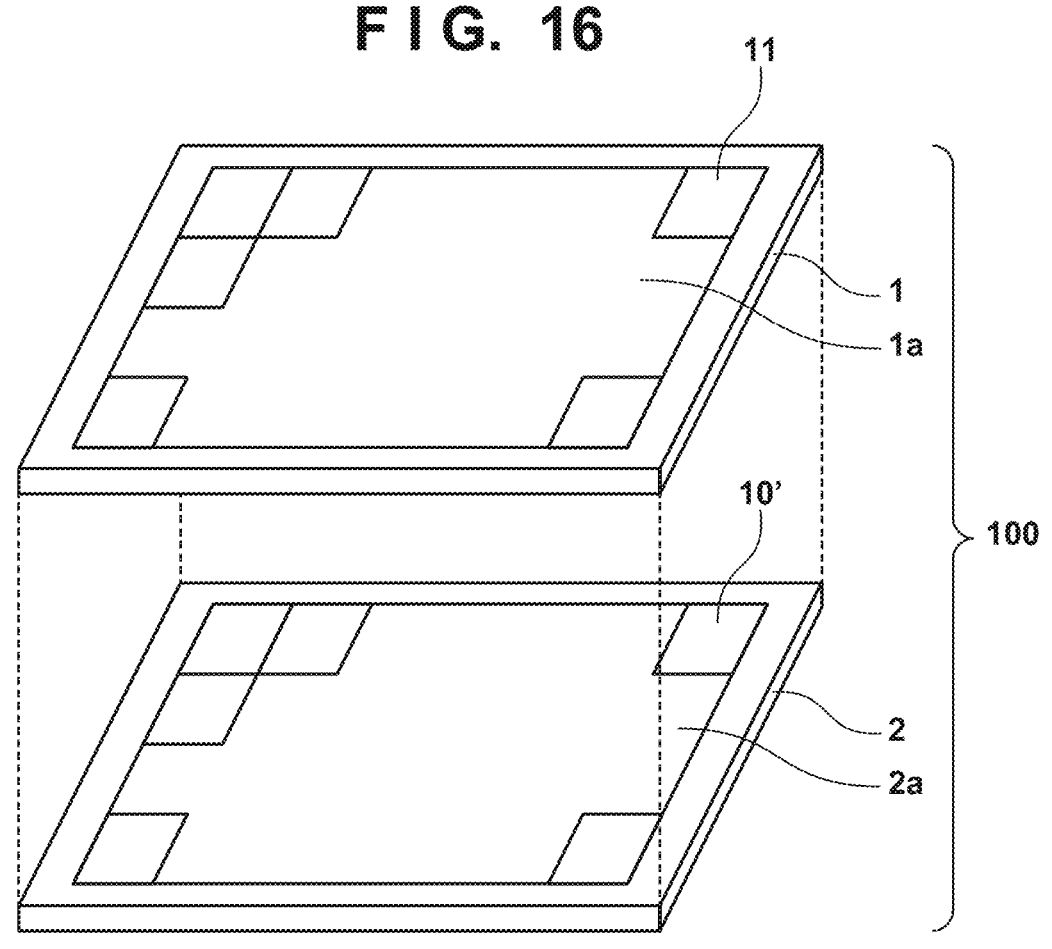

F I G. 17A
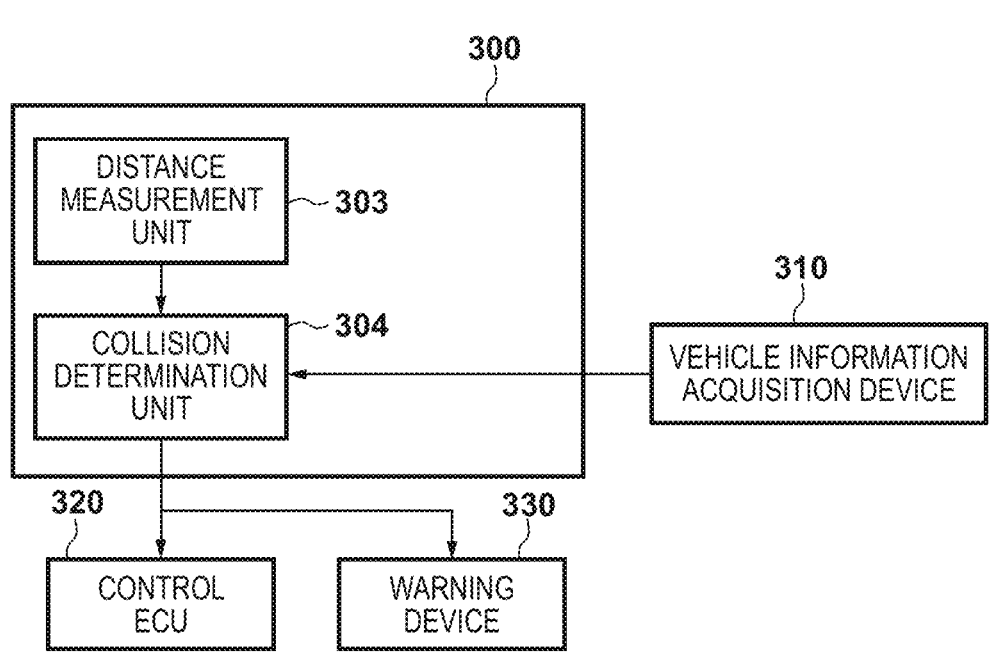
F I G. 17B
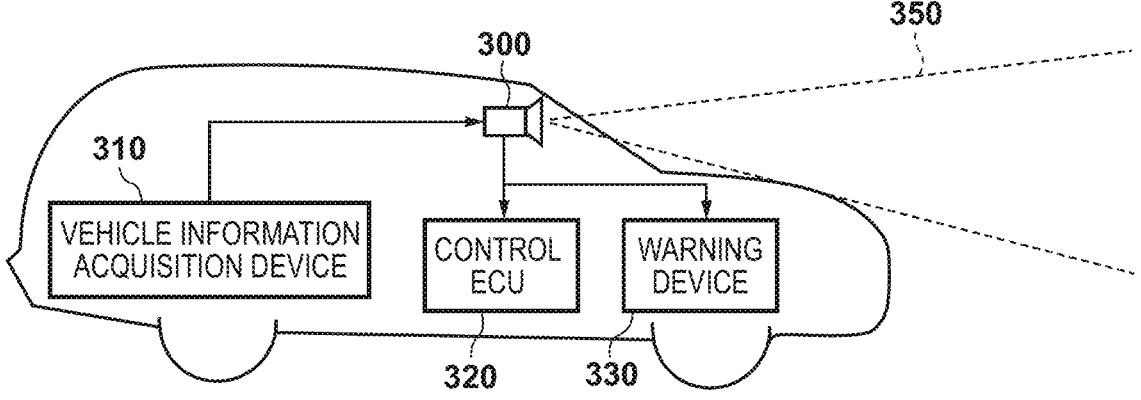

TIME TO DIGITAL CONVERTER, DISTANCE MEASURING DEVICE, AND MOVING BODY

BACKGROUND

Technical Field

The present disclosure relates to a time to digital converter, a distance measuring device, and a moving body.

Description of the Related Art

In recent years, a time to digital converter (TDC) that converts time into a digital signal is applied in various fields. A time to digital converter described in International Publication No. 2013/034770 (patent literature 1) is applied to a sensor capable of capturing a three-dimensional (3D) distance image, and measures the time of flight of a photon detected by a Single Photon Avalanche Diode (SPAD) pixel. Also, the time to digital converter in patent literature 1 includes an upper (coarse) TDC and a lower (fine) TDC.

SUMMARY

According to the present disclosure, there is provided a time to digital conversion circuit comprising: a first measurement block and one or a plurality of second measurement blocks, wherein the first measurement block activates a control signal in accordance with activation of a start signal and measures time from the activation of the start signal to a first edge of a common clock signal, the second measurement block includes a lower measurement circuit and an upper measurement circuit, which are enabled by the activation of the control signal, and the lower measurement circuit measures time from activation of a stop signal to a second edge of the common clock signal, and the upper measurement circuit measures time from the first edge to the second edge.

Further features of the present invention will become apparent from the following description of exemplary embodiments with reference to the attached drawings.

BRIEF DESCRIPTION OF THE DRAWINGS

FIG. 1 is a view showing the configuration of a distance measuring device according to an embodiment;

FIG. 2 is a view showing the configuration of a distance image sensor according to the embodiment;

FIG. 3 is a view showing an example of the configuration of a measurement block that can be used as a first measurement block and a second measurement block;

FIG. 4 is a view showing an example of the configuration of a measurement block formed as the first measurement block and a measurement block formed as the second measurement block;

FIG. 10 is a view exemplarily showing the operations of the distance measuring device and a time to digital converter;

FIG. 11 is a view showing a modification of the control circuit;

FIG. 13 is a view showing the second modification of the distance image sensor;

FIG. 14 is a circuit diagram showing an example of the configuration of a pixel;

FIG. 16 is a view showing the configuration of the distance image sensor; and

FIGS. 17A and 17B are views showing an example of the configuration of a moving body.

DESCRIPTION OF THE EMBODIMENTS

Figure 5:
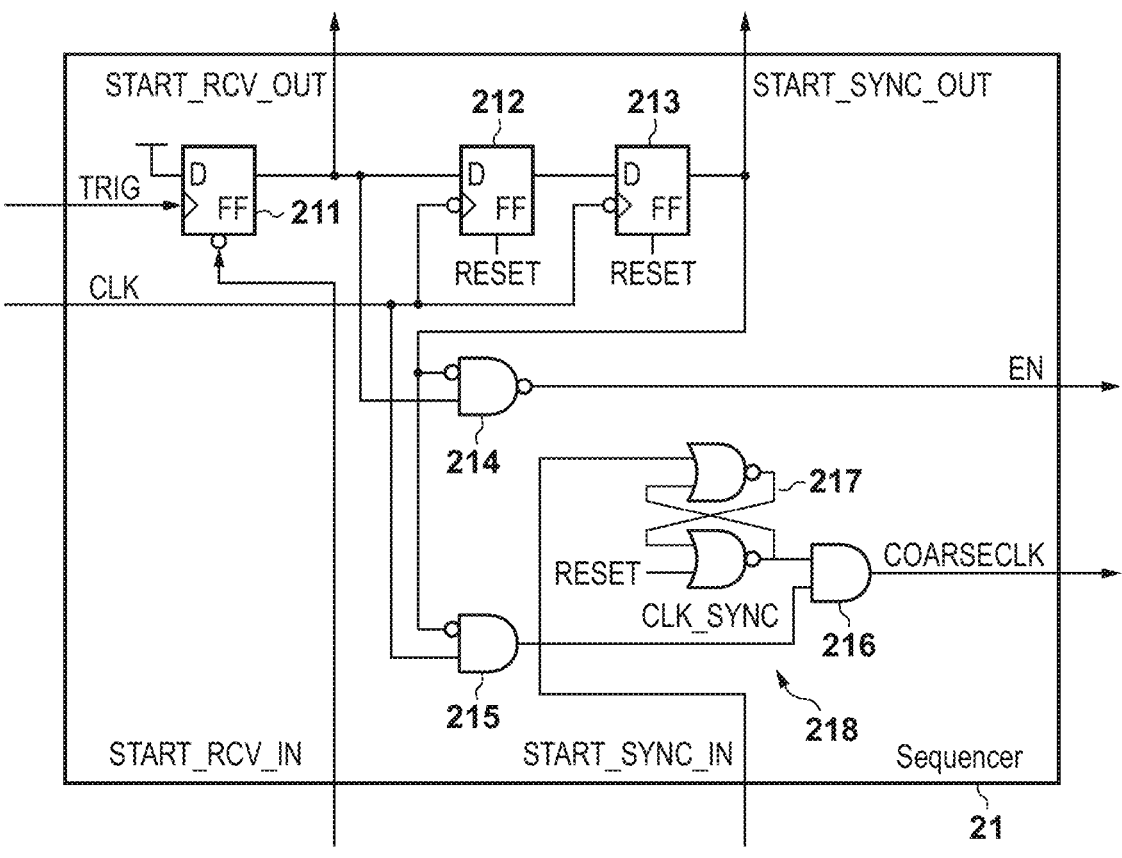
FIG. 5 is a view showing an example of the configuration of a control circuit.

The present disclosers found that if a time to digital converter configured to measure time from reception of a start signal to reception of a stop signal receives the stop signal before the reception of the start signal and reacts to the stop signal, the time cannot correctly be measured even if a start signal and a stop signal corresponding to it are received after that.

The present disclosure relates to a technique advantageous in preventing a measurement error in a time to digital converter.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
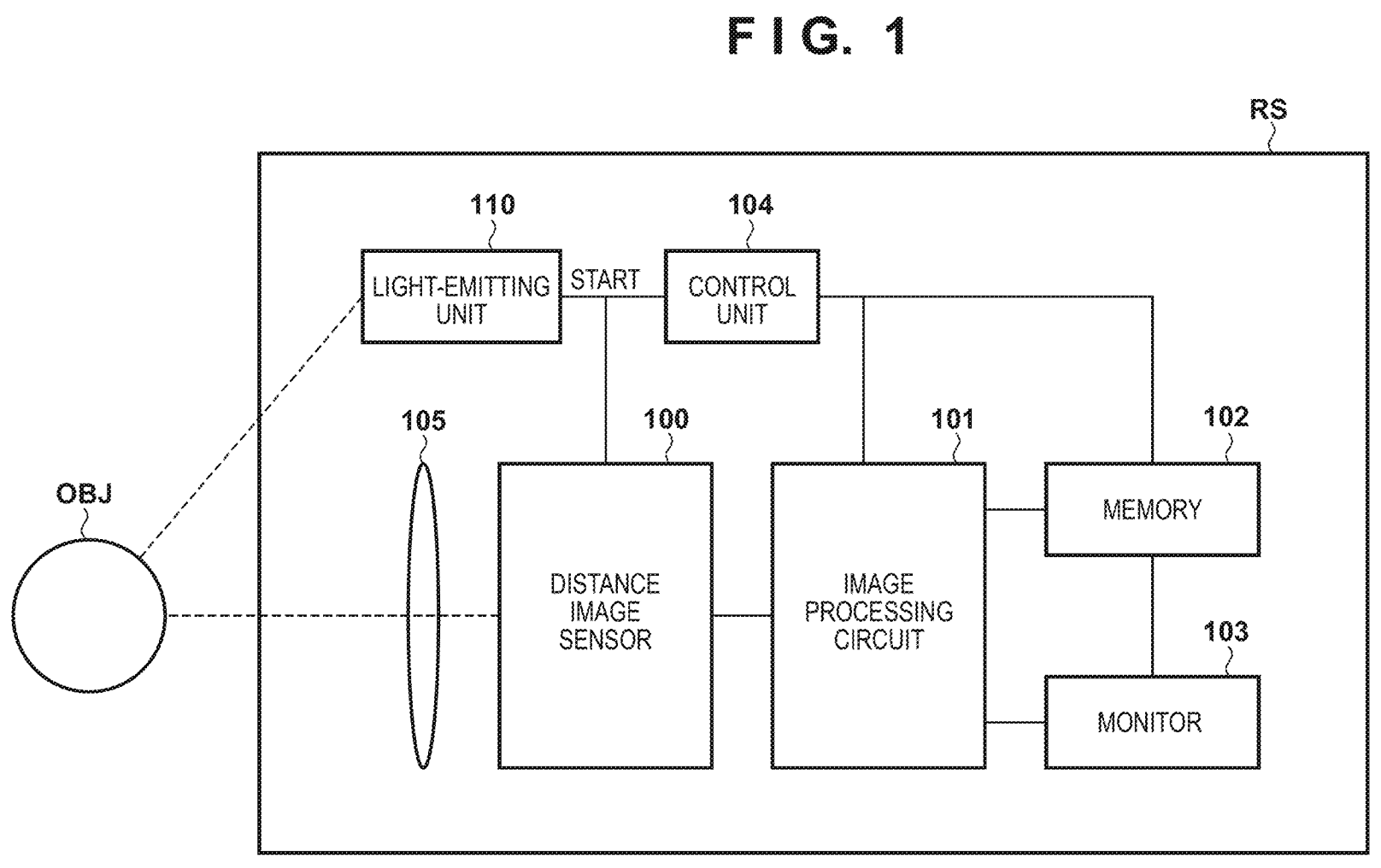

FIG. 1 is a view showing the configuration of a distance measuring device RS according to an embodiment. The distance measuring device RS can be configured as, for example, a distance image generation device that generates a distance image. The distance measuring device RS measures the distance from the distance measuring device RS to an object OBJ based on the time of flight (TOF) of light. The distance measuring device RS can include, for example, a light-emitting unit 110, an optical system 105, a distance image sensor 100, an image processing circuit 101, a memory 102, a monitor 103, and a control unit 104. Note that a description will be made here assuming that the distance measuring device RS includes the distance image sensor 100 as one of a plurality of constituent elements, but the distance image sensor 100 may be understood as the distance measuring device. That is, the distance image sensor 100 can be understood as the minimum constituent element of the distance measuring device RS.

The control unit 104 controls the light-emitting unit 110, the optical system 105, the distance image sensor 100, the image processing circuit 101, the memory 102, and the monitor 103. The control unit 104 can be configured to send a light-emitting instruction to the light-emitting unit 110 and a start instruction START to (a time to digital conversion circuit in) the distance image sensor 100. Sending the start signal START is synonymous with activating the start signal START. The light-emitting instruction may be the same as the start instruction START, or may be a signal activated with a predetermined time difference from the timing of activation of the start signal START.

The light-emitting unit 110 emits pulse light such as a laser beam in response to the light-emitting instruction. If some kind of object OBJ exists in an area irradiated with the pulse light, the pulse light can be reflected by the object OBJ and enter the optical system 105. The optical system 105 forms an optical image of the object OBJ by the incident pulse light on the pixel array of the distance image sensor 100. The distance image sensor 100 can include a pixel array including a plurality of pixels forming the pixel array, and a time to digital conversion circuit that converts time from reception of the start signal START to reception of a stop signal output from each of the plurality of pixels of the pixel array into a digital signal. The pixel is preferably, for example, an avalanche photodiode, particularly, a Single Photon Avalanche Diode (SPAD) that receives a single photon, but it may be a pixel of another type, for example, an event detection type pixel. The image processing circuit 101 can generate a distance image including distance information to the object OBJ based on the signal output from a time to digital converter and the known speed of light. The generated distance image can be output to the memory 102 and the monitor 103. The memory 102 stores the distance image, and the monitor 103 displays the distance image. The image processing circuit 101 may be incorporated in the distance image sensor 100.

Figure 2:
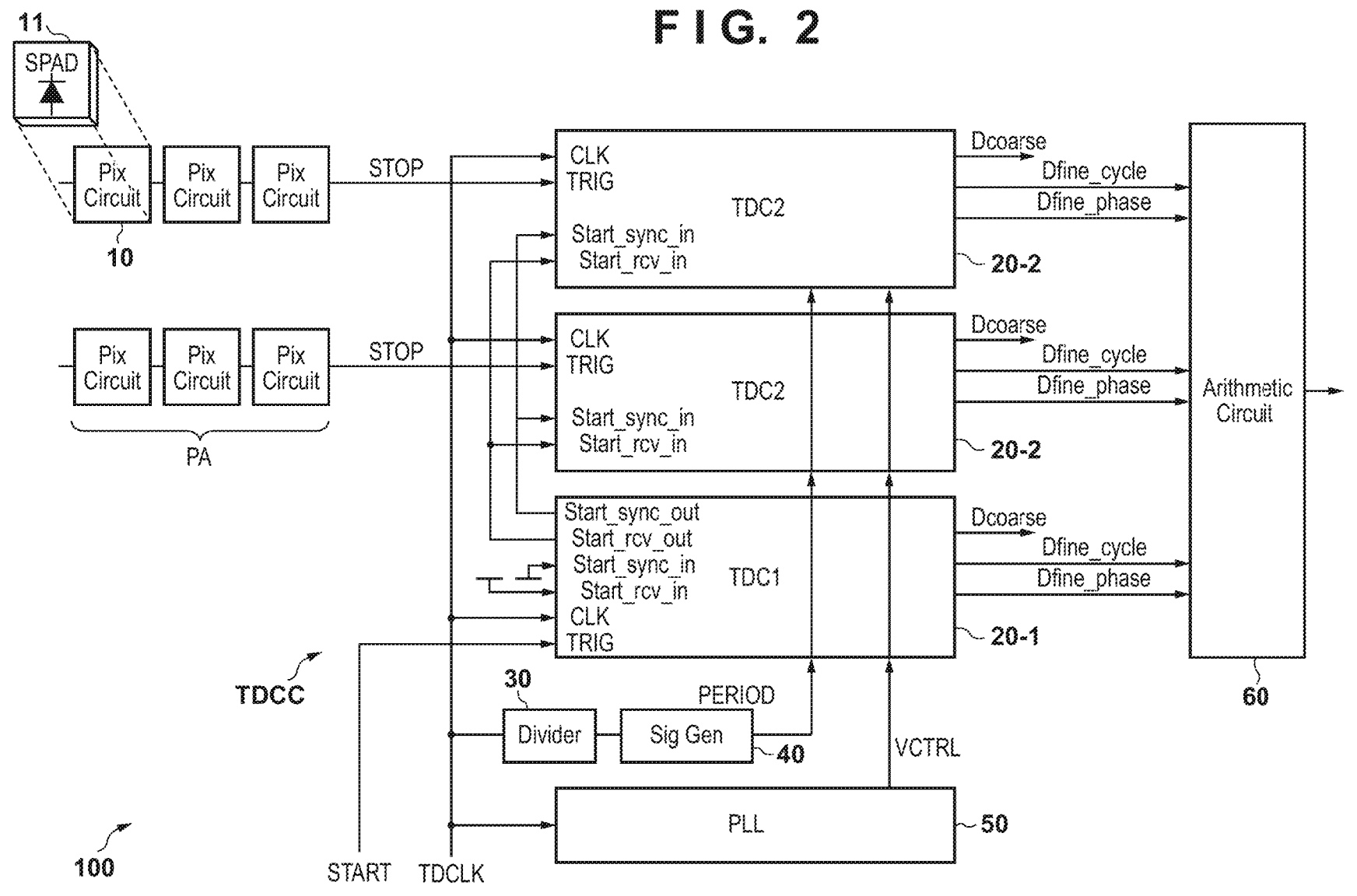

FIG. 2 is a block diagram of the distance image sensor 100. The distance image sensor 100 includes a pixel array PA formed by a plurality of pixels 10 that are arranged to be formed into a plurality of rows and a plurality of columns. The distance image sensor 100 also includes a time to digital converter TDCC that converts, based on a signal from each of the plurality of pixels 10, time from light emission of the light-emitting unit 110 (activation of a start signal START) to light reception by the pixels 10 (activation of a stop signal STOP) into a digital signal. The time to digital converter TDCC can include a first measurement block (TDC1) 20-1, a plurality of second measurement blocks (TDC2) 20-2, and a phase locked loop (PLL) circuit 50. Here, an example in which the time to digital converter TDCC includes a plurality of second measurement blocks 20-2 will be described. However, the time to digital converter TDCC may include only one second measurement block 20-2. That is, the time to digital converter TDCC can include one or a plurality of second measurement blocks 20-2. The first measurement block 20-1 and the second measurement block 20-2 can have the same configuration, as will be described below, but may have different configurations. The time to digital converter TDCC may optionally include a frequency divider 30, a signal generation circuit 40, and an operation circuit 60.

FIG. 14 is a circuit diagram showing an example of the configuration of the pixel 10. The pixel 10 includes, for example, an SPAD 11, a quench element 12, and a waveform shaping unit 13, and functions as a light-receiving unit for pulse light. The SPAD 11 generates a charge pair according to incident light by photoelectric conversion. A voltage VL (first voltage) is supplied to the anode of the SPAD 11, and a voltage VH (second voltage) higher than the voltage VL supplied to the anode is supplied to the cathode of the SPAD 11. A reverse bias voltage is applied between the anode and the cathode, and the SPAD 11 is set in an avalanche multiplication enable state. If a photon enters the SPAD 11 in the state in which the reverse bias voltage is supplied, a charge generated by the photon causes avalanche multiplication, and an avalanche current is generated.

The quench element 12 is provided between the power supply line that supplies the voltage VH and the cathode of the SPAD 11. The quench element 12 functions as a load circuit (quench circuit) at the time of signal multiplication by avalanche multiplication, and has a function of suppressing a voltage to be supplied to the SPAD 11 and suppressing avalanche multiplication (quench operation). Additionally, the quench element 12 has a function of returning the voltage to be supplied to the SPAD 11 to the voltage VH (recharge operation) by flowing a current as much as the voltage drop by the quench operation.

The waveform shaping unit 13 can function as a signal generation unit that generates a detection pulse serving as the stop signal STOP in response to an output change that occurs in the cathode of the SPAD 11 upon incidence of photons. That is, the waveform shaping unit 13 can shape the potential change of the cathode of the SPAD 11 obtained at the time of photon detection and output the STOP signal (detection pulse) of a rectangular wave. The waveform shaping unit 13 can be formed by, for example, an inverter circuit. FIG. 14 shows the waveform shaping unit 13 formed by one inverter circuit. However, the waveform shaping unit 13 may be formed by connecting a plurality of inverter circuits in series, or the waveform shaping unit 13 may be formed by another circuit having a waveform shaping effect.

Figure 3:
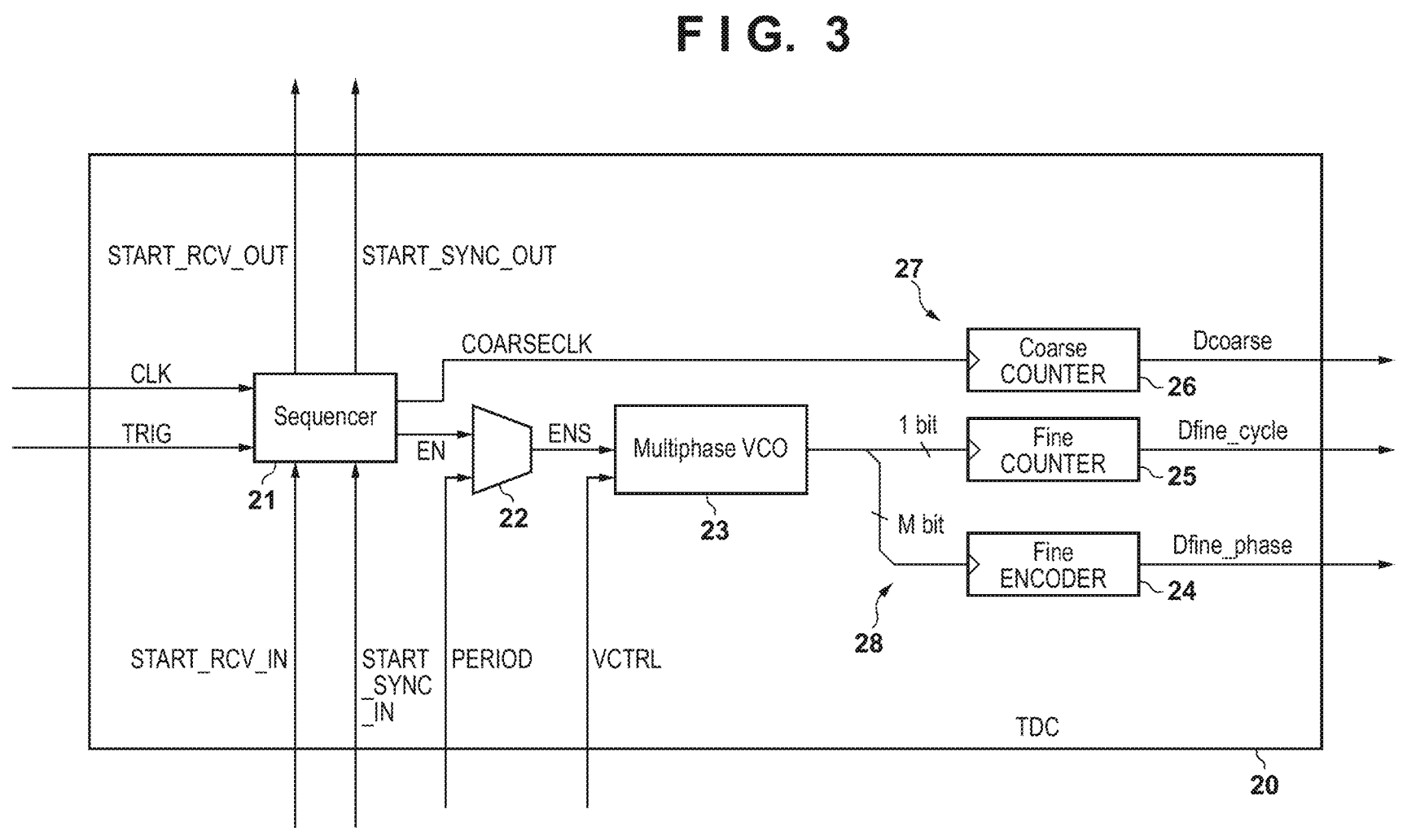

FIG. 3 is a view showing an example of the configuration of a measurement block 20 that can be used as the first measurement block 20-1 and the second measurement block 20-2. The measurement block 20 can be configured as the first measurement block 20-1 or the second measurement block 20-2 depending on a signal or a voltage applied to the input terminal of the measurement block 20. The first measurement block 20-1 and the second measurement block 20-2 may have different configurations, as a matter of course.

The measurement block 20 can include, for example, a control circuit (sequencer) 21, a multiplexer 22, a multiphase voltage controlled oscillator (VCO) 23, a lower encoder 24, a lower counter 25, and an upper counter 26. The upper counter 26 forms an upper measurement circuit 27 that generates the upper bit string of digital data output from the measurement block 20. The multiphase VCO 23, the lower encoder 24, and the lower counter 25 form a lower measurement circuit 28 that generates the lower bit string of digital data output from the measurement block 20.

The control circuit 21 can have a clock input terminal CLK and a trigger input terminal TRIG. A common clock signal TDCLK is supplied to the clock input terminal CLK. The common clock signal TDCLK can be a global clock signal commonly used in the distance measuring device RS. The start signal START is supplied to the trigger input terminal TRIG of the measurement block 20 formed as the first measurement block 20-1. On the other hand, the stop signal STOP is supplied to the trigger input terminal TRIG of the measurement block 20 formed as the second measurement block 20-2. The control circuit 21 generates a clock signal CoarseCLK and an enable signal EN in accordance with the common clock signal TDCLK supplied to the clock input terminal CLK and the start signal START or the stop signal STOP supplied to the trigger input terminal TRIG. The clock signal CoarseCLK is a clock signal for the upper measurement circuit 27 (upper counter 26). The enable signal EN is a signal that enables the lower measurement circuit 28 (multiphase VCO 23).

The multiplexer 22 is a switching circuit that selects one of the enable signal EN and a period measurement signal PERIOD from the signal generation circuit 40 in accordance with an operation mode, and outputs the selected signal as an enable signal ENS to the multiphase VCO 23. Here, the time to digital converter TDCC can have a distance image generation mode for generating a distance image and a period measurement mode for measuring the periods of the lower encoder 24, the lower counter 25, and the upper counter 26. In the distance image generation mode, the multiplexer 22 outputs the enable signal EN as the enable signal ENS, and in the period measurement mode, the multiplexer 22 outputs the period measurement signal PERIOD for correction processing as the enable signal ENS. In the period measurement mode, the periods of the lower encoder 24, the lower counter 25, and the upper counter 26 are measured, and the result can be stored as calibration data in the operation circuit 60. The operation circuit 60 can correct digital data obtained in the distance image generation mode based on the calibration data.

The multiphase VCO 23 can be an oscillation circuit, more specifically, a multiphase output type voltage controlled oscillation circuit such as a ring oscillator circuit. If the ring oscillator circuit is formed by M (M is an integer of 2 or more) inverting circuits, the multiphase VCO 23 generates an M-bit clock signal. Details of the multiphase VCO 23 will be described later.

The lower encoder 24 encodes the M-bit clock signal from the multiphase VCO 23 and outputs binary code data Dfine_phase. The lower counter 25 counts the number of periods of a 1-phase (1-bit) clock signal in the M-bit clock signal from the multiphase VCO 23, and outputs binary code data Dfine_cycle.

The upper counter 26 is used only on the second measurement block 20-2. The upper counter 26 starts counting the clock signal CoarseCLK (clock signal TDCLK) in response to the rise of the start signal START, and stops counting in response to the rise of the stop signal STOP. The upper counter 26 outputs the count result as binary code data Dcoarse.

FIG. 4 is a view exemplarily showing the measurement block 20 formed as the first measurement block 20-1 and the measurement block 20 formed as the second measurement block 20-2. The second measurement block 20-2 can be provided in correspondence with, for example, each row of the pixel array PA. The plurality of pixels 10 of each row of the pixel array PA (that is, the pixels 10 of different columns) can be selected by a selection circuit (not shown) and sequentially connected to the second measurement block 20-2.

High level (active level) is supplied to a first control input terminal START_RCV_IN of the first measurement block 20-1. A second control input terminal START_SYNC_IN of the first measurement block 20-1 is fixed to low level (inactive level). A first control output terminal START_RCV_OUT of the first measurement block 20-1 is connected to each of the first control input terminals START_RCV_IN of all the second measurement blocks 20-2 and supplies a first control signal Start_rcv. A second control output terminal START_SYNC_OUT of the first measurement block 20-1 is connected to each of the second control input terminals START_SYNC_IN of all the second measurement blocks 20-2 and supplies a second control signal Start_Sync. Also, as described above, the start signal START is supplied to the trigger input terminal TRIG of the first measurement block 20-1, and the stop signal STOP is supplied to the trigger input terminal TRIG of the second measurement block 20-2.

FIG. 10 is a view exemplarily showing the operations of the distance measuring device RS and the time to digital converter TDCC. The outline of the operations of the distance measuring device RS and the time to digital converter TDCC will be described with reference to FIGS. 3, 4, and 10. The first measurement block 20-1 activates the first control signal Start_rcv in accordance with activation of the start signal START, and measures time Tst from the activation of the start signal START to a first edge E1 of the common clock signal TDCLK. The first measurement block 20-1 can include the first control circuit 21 that activates the first control signal Start_rcv in accordance with the activation of the start signal START, and the lower measurement circuit 28 that measures the time Tst from the activation of the start signal START to the first edge E1.

The second measurement block 20-2 includes the lower measurement circuit 28 and the upper measurement circuit 27, which are enabled by activation of the first control signal Start_rcv and the second control signal Start_Sync. The lower measurement circuit 28 measures time Tstop from the activation of the stop signal STOP to a second edge E2 of the common clock signal TDCLK. The upper measurement circuit 27 measures time Δt from the first edge E1 to the second edge E2.

Here, as is apparent from FIG. 10, the time Δt from activation of the start signal START to activation of the stop signal STOP is represented by $$\Delta t = Tst + \text{Tcoarse} - \text{Tstop}$$

Tst is given by a lower bit string Dfine formed by Dfine_cycle and Dfine_cycle obtained by the lower measurement circuit 28 of the first measurement block 20-1. Tstop is given by the lower bit string Dfine formed by Dfine_cycle and Dfine_cycle obtained by the lower measurement circuit 28 of the second measurement block 20-2. Tcoarse is given by the upper bit string Dcoarse formed by Dcoarse obtained by the upper measurement circuit 27 of the second measurement block 20-2. The operation circuit 60 generates digital data corresponding to the time Δt based on these and outputs it.

Figure 6:
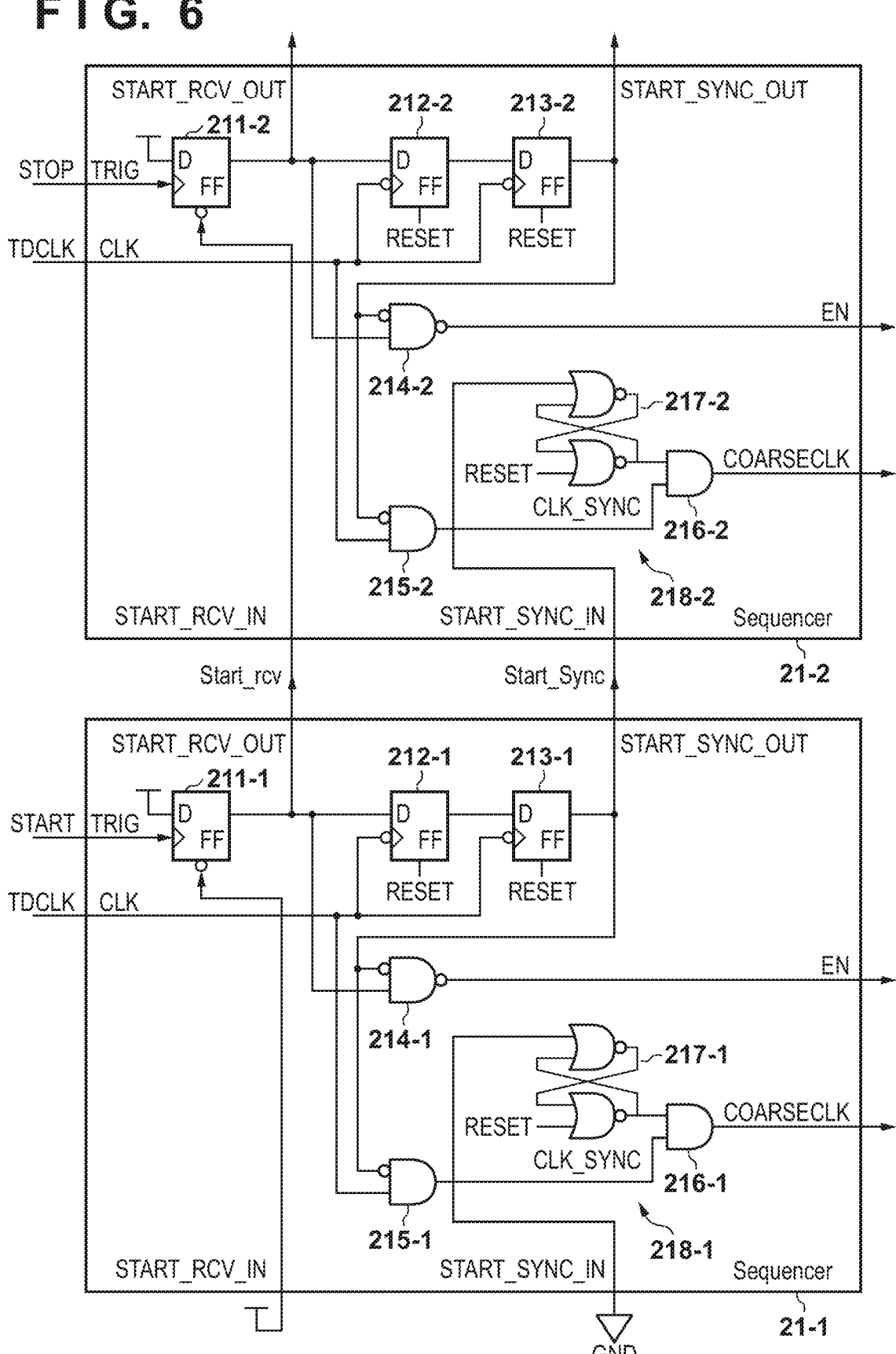
FIG. 6 is a view showing an example of the configuration of the control circuit of each of the first measurement block and the second measurement block.

FIG. 5 is a circuit diagram showing an example of the configuration of the control circuit 21. FIG. 6 exemplarily shows a first control circuit 21-1 that is the control circuit 20 of the measurement block 20 formed as the first measurement block 20-1. FIG. 6 also exemplarily shows a second control circuit 21-2 that is the control circuit 20 of the measurement block 20 formed as the second measurement block 20-2.

The first control circuit 21-1 of the first measurement block 20-1 can activate the first control signal Start_rcv in accordance with activation of the start signal START. Also, the first control circuit 21-1 of the first measurement block 20-1 can output a signal obtained by synchronizing the first control signal Start_rcv in accordance with the common clock signal TDCLK as the second control signal Start_Sync.

The second control circuit 21-2 of the second measurement block 20-2 causes the upper measurement circuit 27 of the second measurement block 20-2 to start measurement if the second control signal Start_Sync is activated next to activation of the first control signal Start_rcv. Also, the second control circuit 21-2 causes the lower measurement circuit 28 of the second measurement block 20-2 to start measurement if the stop signal STOP is activated in a state in which the first control signal Start_rcv is activated. The second control circuit 21-2 causes the upper measurement circuit 27 of the second measurement block 20-2 to end measurement in response to the second edge E2. Also, the second control circuit 21-2 causes the lower measurement circuit 28 of the second measurement block 20-2 to end measurement in response to the second edge E2. In this way, the second measurement block 20-2 is enabled by the first control signal Start_rcv and the second control signal Start-_Sync, thereby preventing a measurement error caused by the stop signal STOP that can arrive before the start signal START.

The first control circuit 21-1 can include a first detection circuit 211-1 that activates the first control signal Start_rcv in asynchronism with the common clock signal TDCLK in accordance with activation of the start signal START. The first control circuit 21-1 can also include a second detection circuit (212-1 and 213-1) that activates the second control signal Start_Sync in synchronism with the common clock signal TDCLK in accordance with activation of the first control signal Start_rcv. The second detection circuit can include a first flip-flop 212-1 and a second flip-flop 213-1. The first flip-flop 212-1 can receive the first control signal Start_rcv in response to the third edge of the common clock signal TDCLK that arrives next to the activation of the first control signal Start_rcv. The second flip-flop 213-1 can receive the output of the first flip-flop 212-1 in response to the fourth edge of the common clock signal TDCLK that arrives next to the third edge, thereby generating the second control signal Start_Sync.

The second control circuit 21-2 can include a third detection circuit 211-2 that activates the output of itself in asynchronism with the common clock signal TDCLK in accordance with activation of the stop signal STOP. The second control circuit 21-2 can also include a fourth detection circuit (212-2 and 213-2) that activates the output of itself in accordance with activation of the third detection circuit 211-2.

The fourth detection circuit can include a third flip-flop 212-2 and a fourth flip-flop 213-2. The third flip-flop 212-2 can receive the output of the third detection circuit 211-2 in response to the fifth edge of the common clock signal TDCLK that arrives next to the activation of the output of the third detection circuit 211-2. The fourth flip-flop 213-2 can receive the output of the third flip-flop 212-2 in response to the sixth edge of the common clock signal TDCLK that arrives next to the fifth edge, thereby updating the output of itself.

The first control circuit 21-1 of the first measurement block 20-1 can include a first enable circuit 214-1. The first enable circuit 214-1 activates the enable signal EN when the first control signal Start_rcv that is the output of the first detection circuit 211-1 is activated in accordance with activation of the start signal START. Measurement by the lower measurement circuit 28 of the first measurement block 20-1 is thus started. The first control circuit 21-1 of the first measurement block 20-1 can include a second enable circuit 218-1. The second enable circuit 218-1 can be formed by circuits 215-1, 216-1, and 217-1. Since the second control input terminal START_SYNC_IN of the first control circuit 21-1 is fixed to low level (inactive level), the second enable circuit 218-1 does not toggle the clock signal CoarseCLK for the upper measurement circuit 27.

The second control circuit 21-2 of the second measurement block 20-2 can include a third enable circuit 214-2. The third enable circuit 214-2 activates the enable signal EN when the output of the third detection circuit 211-2 is activated in accordance with activation of the stop signal STOP. Measurement by the lower measurement circuit 28 of the second measurement block 20-2 is thus started. The second control circuit 21-2 to the second measurement block 20-2 can include a fourth enable circuit 218-2. The fourth enable circuit 218-2 can be formed by circuits 215-2, 216-2, and 217-2. To the second control input terminal START-_SYNC_IN of the second control circuit 21-2, the second control signal Start_Sync is supplied from the second control output terminal START_SYNC_OUT of the first control circuit 21-1. If the second control signal Start_Sync is activated, in accordance with this, the fourth enable circuit 218-2 outputs the common clock signal TDCLK as the clock signal CoarseCLK for the upper measurement circuit 27. The upper measurement circuit 27 of the second measurement block 20-2 thus starts measurement. On the other hand, if the fourth flip-flop 213-2 activates the output in response to the second edge of the common clock signal TDCLK, the fourth enable circuit 218-2 stops toggling the clock signal CoarseCLK for the upper measurement circuit 27. The upper measurement circuit 27 of the second measurement block 20-2 thus stops measurement.

Figure 7:
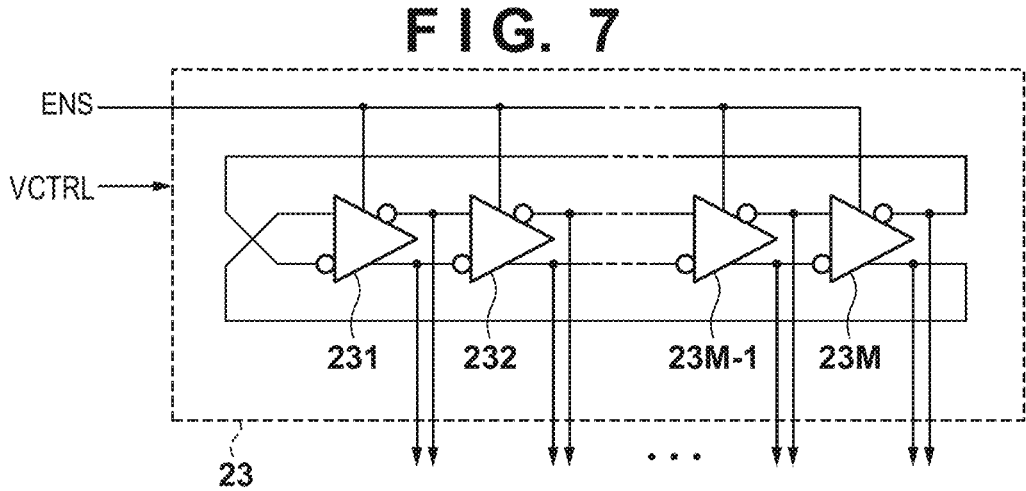
FIG. 7 is a circuit diagram showing an example of the configuration of a multiphase VCO.

FIG. 7 is a circuit diagram showing the configuration of the multiphase VCO 23. The multiphase VCO 23 can be formed by a ring oscillator circuit including M inverting circuits 231 to 23M. The noninverting output node of the inverting circuit 231 is connected to the inverting input node of the inverting circuit 232, and the inverting output node of the inverting circuit 231 is connected to the noninverting input node of the inverting circuit 232. The inverting circuits 232 to 23M are similarly cascade-connected, and the output node of the inverting circuit 23M is connected to the input node of the inverting circuit 231. Also, the enable signal EN is input to the inverting circuits 231 to 23M. If the enable signal ENS changes to high level, the output signals of the output nodes of the inverting circuits 231 to 23M sequentially repeat inversion with a predetermined delay time. The multiphase VCO 23 thus operates as an M-bit multiphase oscillation circuit. If an enable signal EN21-1 changes to low level, the inverting operations of the inverting circuits 231 to 23M stop, and the M-bit output signal is reset to the initial value (initial phase). Also, a control voltage VCTRL is applied to the multiphase VCO 23, and the oscillation frequencies and phases of the inverting circuits 231 to 23M can be controlled by the control voltage VCTRL. For example, the control voltage VCTRL is applied to the gate node of a current source transistor or a load transistor forming each of the inverting circuits 231 to 23M. Hence, the delay time (phase) of each of the inverting circuits 231 to 23M changes in accordance with the control voltage VCTRL, and the oscillation frequency and phase of the ring oscillator circuit can be controlled.

Figure 8:
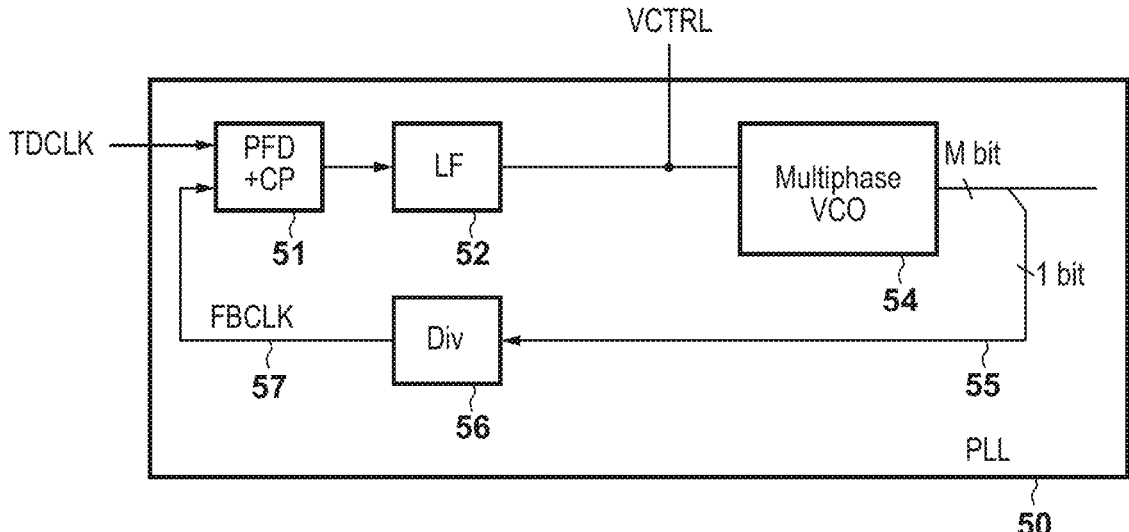
FIG. 8 is a circuit diagram showing an example of the configuration of a PLL circuit.

FIG. 8 is a circuit diagram showing an example of the configuration of the PLL circuit 50. The PLL circuit 50 is a phase synchronization circuit. The PLL circuit 50 can include, for example, a phase comparator 51, a loop filter 52, a multiphase VCO 54, and a frequency divider 56. The multiphase VCO 54 is formed by a ring oscillator circuit, and preferably has the same characteristic as the multiphase VCO 23. For example, the multiphase VCO 54 can be formed as a replica circuit having the same circuit configuration and the same size as the multiphase VCO 23 on a semiconductor substrate. The frequency divider 56 divides the frequency of a 1-bit clock signal of M bits of the multiphase VCO 54 into 1/N (N is an integer of 2 or more), and outputs a feedback clock signal FBCLK. That is, the feedback clock signal FBCLK is the frequency division signal of the oscillation period of the multiphase VCO 54. The phase comparator 51 includes a phase comparison circuit and a charge pump circuit, and outputs a charge pump voltage obtained by integrating the phase difference between the common clock signal TDCLK and the feedback clock signal FBCLK. The loop filter 52 smoothes the charge pump voltage and outputs the control voltage VCTRL. The control voltage VCTRL is supplied to the multiphase VCO 54, and the phase of the multiphase VCO 54 is controlled by the control voltage VCTRL. This makes the common clock signal TDCLK and the feedback clock signal FBCLK obtained by dividing the frequency of the output signal of the multiphase VCO 54 have the same phase. Also, the control voltage VCTRL is supplied to the multiphase VCO 23 of each TDC 20 in a similar manner. The multiphase VCO 23 of the TDC 20 oscillates at a frequency N (N is an integer of 2 or more) times higher than the frequency of the clock signal TDCLK, and the phases of the multiphase VCOs 23 are synchronized. Since the frequencies and phases of the multiphase VCOs 23 of the plurality of TDCs 20 are controlled by the common PLL circuit 50, robustness to the manufacturing process, the voltage, and the temperature can be obtained. Hence, even if the element size of the multiphase VCOs 23 and 54 is reduced, characteristic variations in the plurality of TDCs 20 can be suppressed and highly accurate time to digital conversion can be implemented while reducing power consumption.

Figure 9:
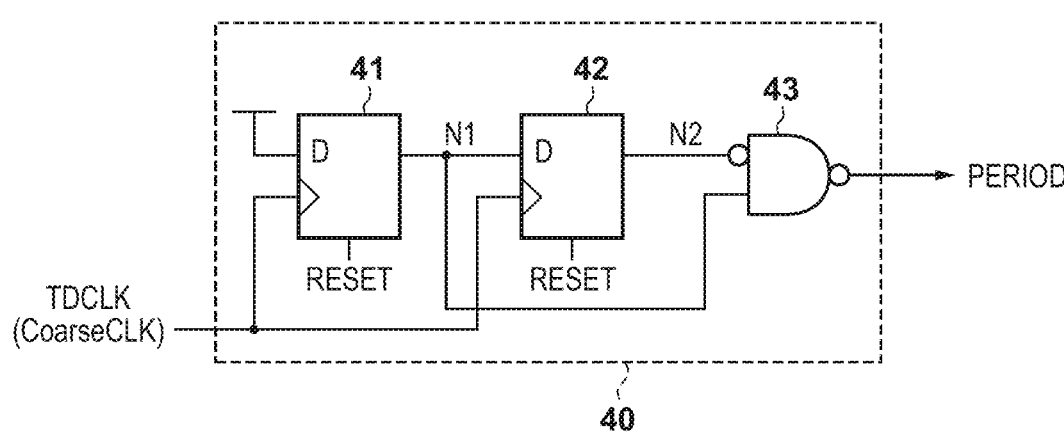
FIG. 9 is a circuit diagram showing the configuration of a signal generation circuit.

The frequency divider 30 and the signal generation circuit 40 generate the signal PERIOD for the period measurement mode. FIG. 9 is a circuit diagram showing the configuration of the signal generation circuit 40. The signal generation circuit 40 can include flip-flops 41 and 42, and a gate 43. The flip-flops 41 and 42 are D flip-flops, and these are cascade-connected. An input node D of the flip-flop 41 is fixed to high level (power supply voltage), and an output node N1 of the flip-flop 41 is connected to the input node D of the flip-flop 42. Also, the common clock signal TDCLK is supplied to the clock nodes of the flip-flops 41 and 42. The noninverting input node of the gate 43 is connected to the node N1, and the inverting input node of the gate 43 is connected to a node N2. After a reset signal RESET supplied to the reset nodes of the flip-flops 41 and 42 changes to low level, the node N1 changes to high level at the rise timing of the clock signal TDCLK. At the rise timing of the clock signal TDCLK after one period, the node N2 changes to high level. For this reason, the signal PERIOD that changes to high level for the clock signal TDCLK of one period is output from the output node of the gate 43. Also, when frequency divider 30 divides the frequency of the clock signal TDCLK at the preceding stage of the signal generation circuit 40, the signal PERIOD that changes to high level for every two periods or four periods of the clock signal TDCLK can be generated.

FIG. 11 shows a modification of the control circuit 21. A control circuit 21' is a modification of the control circuit 21. In the control circuit 21', the second control input terminal START_Sync_IN and the second control output terminal START_Sync_OUT are removed. The first control signal Start_rcv driven by the control circuit 21' of the first measurement block 20-1 is received by the first control input terminal START_RCV_IN of the control circuit 21' of the second measurement block 20-2. The first control input terminal START_RCV_IN is connected to the set terminal of a circuit 217 (SR latch) of the second enable circuit 218-1. Hence, in the control circuit 21' of the second measurement block 20-2, the second enable circuit 218-1 enables the upper measurement circuit 27 in response to activation of the first control signal Start_rcv. That is, in this modification, the control circuit 21' of the second measurement block 20-2 enables measurement in the second measurement block 20-2 in accordance with activation of the first control signal Start_rcv. In other words, (measurement in) the second measurement block 20-2 is enabled when the first measurement block 20-1 activates the first control signal Start_rcv.

Figure 12:
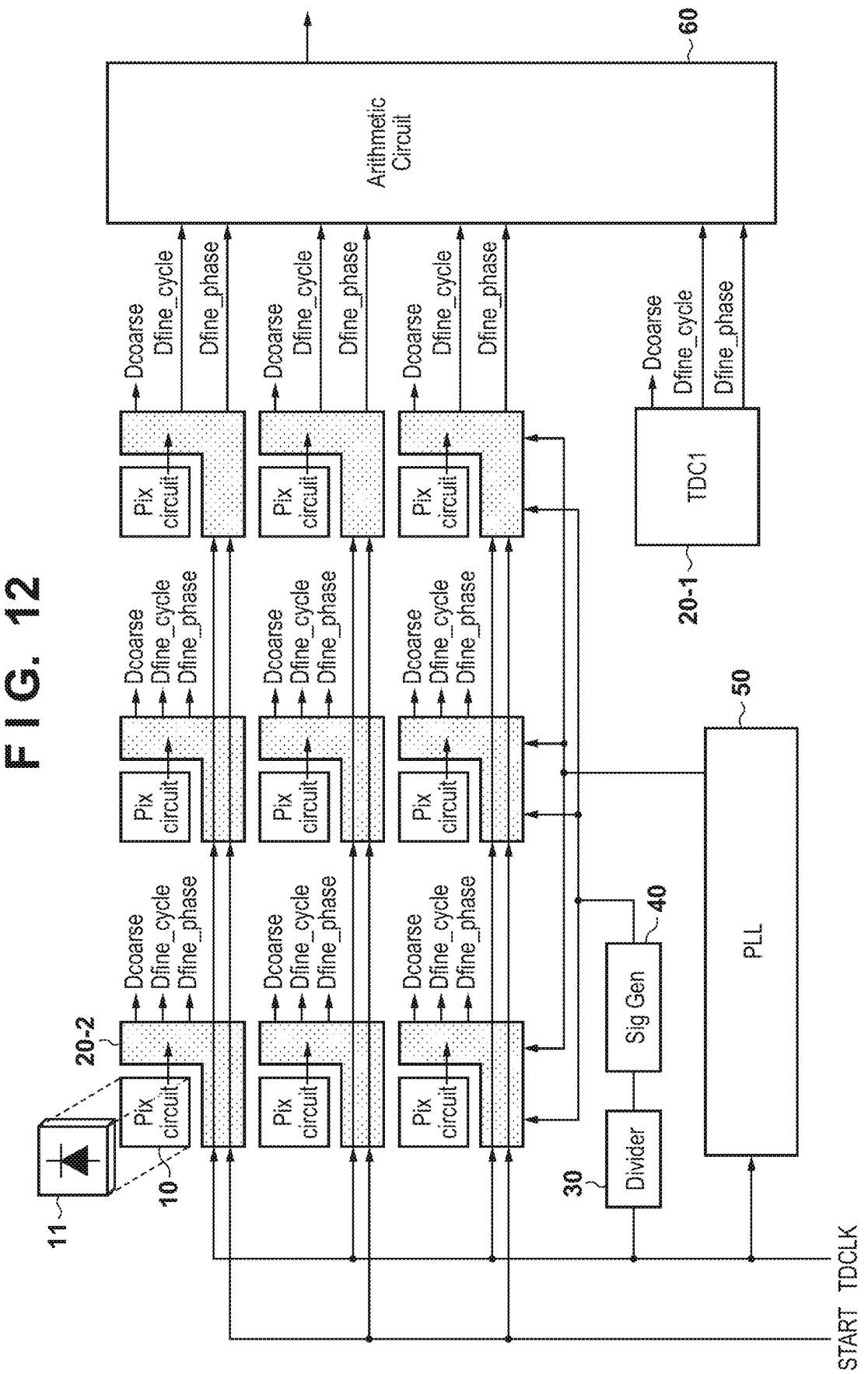
FIG. 12 is a view showing the first modification of a distance image sensor.

FIG. 12 is a view showing the first modification of the distance image sensor 100. In the first modification, one second measurement block 20-2 is provided for one pixel 10. FIG. 13 is a view showing the second modification of the distance image sensor 100. In the second modification, the plurality of pixels 10 forming the pixel array are divided into a plurality of groups, each group is formed by at least two pixels 10, and one second measurement block 20-2 is provided for one group. In another viewpoint, each group can be formed by the pixels 10 belonging to two continuous rows and at least two continuous columns.

Figure 15:
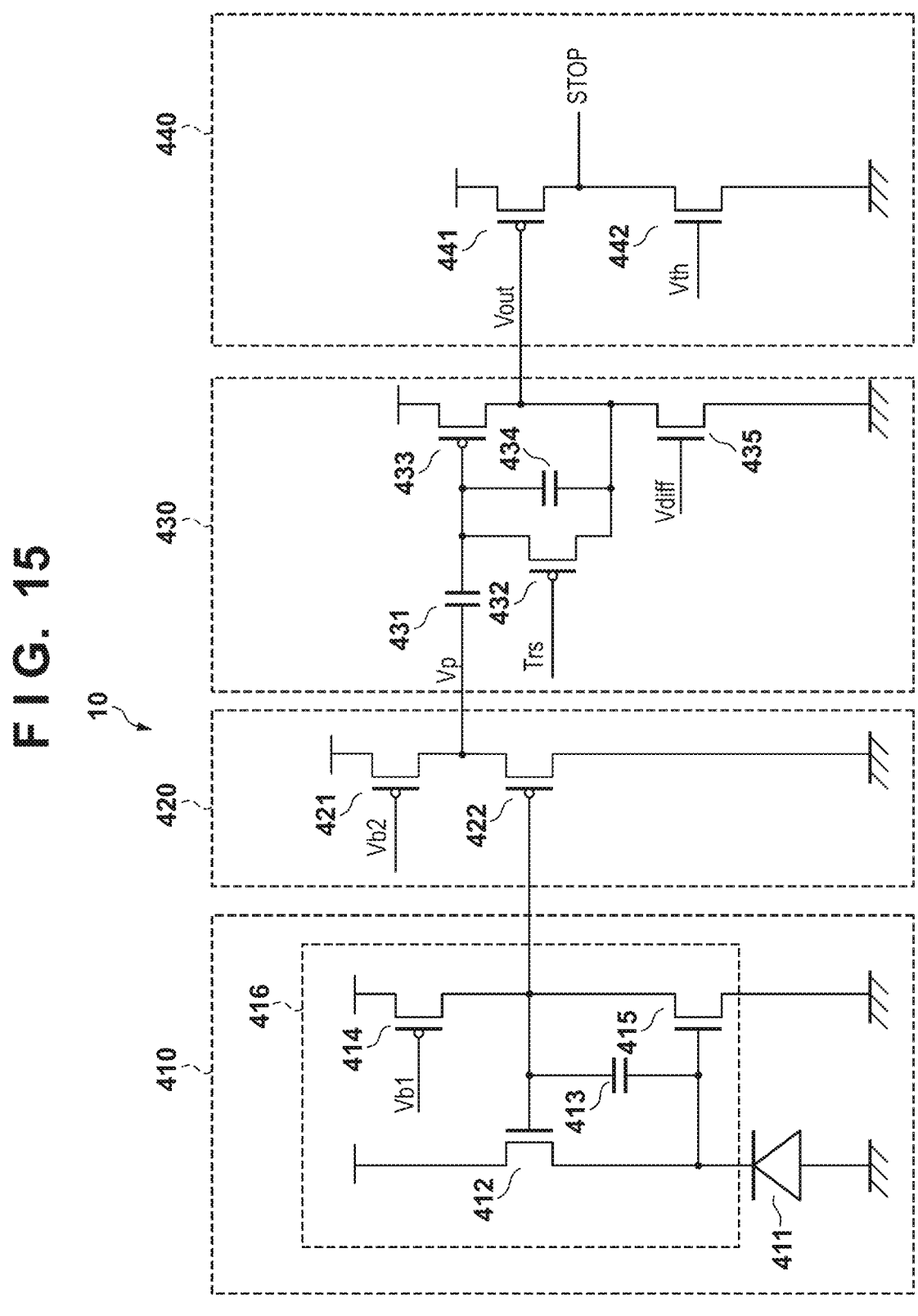
FIG. 15 is a circuit diagram showing another example of the configuration of the pixel.

FIG. 15 shows another example of the configuration of the pixel 10. In the configuration example shown in FIG. 15, the pixel 10 is an event detection type pixel. The pixel 10 can include a logarithmic response unit 410, a buffer 420, a differentiation circuit 430, and a comparator 440. The logarithmic response unit 410 can include a photoelectric conversion element 411 and a current-voltage conversion unit 416. The photoelectric conversion element 411 can be a photodiode that does not cause avalanche multiplication. When pulse light enters, the photoelectric conversion element 411 generates a photocurrent by photoelectric conversion. The current-voltage conversion unit 416 logarithmically converts the photocurrent into a pixel voltage Vp. The current-voltage conversion unit 416 can include n-type transistors 412 and 415, a capacitor 413, and a p-type transistor 414.

The source of the n-type transistor 412 is connected to the cathode of the photoelectric conversion element 411, and the drain is connected to the power supply terminal. The p-type transistor 414 and the n-type transistor 415 are connected in series between the power supply line and the ground line. The connecting point between the p-type transistor 414 and the n-type transistor 415 is connected to the gate of the n-type transistor 412 and the input terminal of the buffer 420. The connecting point between the n-type transistor 412 and the photoelectric conversion element 411 is connected to the gate of the n-type transistor 415. A bias voltage Vb1 is applied to the gate of the p-type transistor 414. The capacitor 413 is arranged between the gate of the n-type transistor 412 and the gate of the n-type transistor 415.

The buffer 420 can include p-type transistors 421 and 422. The p-type transistors 421 and 422 are connected in series between the power supply line and the ground line. The gate of the p-type transistor 422 is connected to the logarithmic response unit 410, and the connecting point between the p-type transistors 421 and 422 is connected to the differentiation circuit 430. A bias voltage Vb2 is applied to the gate of the p-type transistor 421.

The differentiation circuit 430 includes a capacitor 431, p-type transistors 432 and 433, and an n-type transistor 435. The differentiation circuit 430 may further include a capacitor 434. The p-type transistor 433 and the n-type transistor 435 are connected in series between the power supply line and the ground line. A bias voltage Vdiff is applied to the gate of the n-type transistor 435. The capacitor 431 is inserted between the buffer 420 and an input terminal the p-type transistor 433. The capacitor 431 supplies, to the input terminal 491, a current according to the time differential of a pixel voltage Vp from the buffer 420. The capacitor 434 can be arranged between the gate and the grain of the p-type transistor 433, but the capacitor 434 may be omitted.

The p-type transistor 432 short-circuits the gate and the drain of the p-type transistor 433 in response to an initialization signal Trs to set a differential signal Vout to an initial value.

The comparator 440 can include a p-type transistor 441 and an n-type transistor 442. The p-type transistor 441 and the n-type transistor 442 are connected in series between the power supply line and the ground line. The gate of the p-type transistor 441 is connected to the differentiation circuit 430. A threshold Vth is applied to the gate of the n-type transistor 442. The stop signal STOP is output from the connecting point between the p-type transistor 441 and the n-type transistor 442.

FIG. 16 shows an example of the configuration of the distance image sensor 100. In this configuration example, the distance image sensor 100 has a layered structure of a plurality of substrates. The distance image sensor 100 includes a sensor substrate (first substrate) 1 and a circuit substrate (second substrate) 2, which are stacked on each other, and the sensor substrate 1 and the circuit substrate 2 are electrically connected to each other. The distance image sensor 100 is of a back illumination type. Light enters from the first surface of the sensor substrate 1, and the circuit substrate 2 is arranged on the second surface of the sensor substrate 1. The sensor substrate 1 includes a first semiconductor layer and a first wiring structure. The circuit substrate 2 includes a second semiconductor layer and a second wiring structure. The second semiconductor layer, the second wiring structure, the first wiring structure, and the first semiconductor layer are stacked in this order, thereby forming the distance image sensor 100.

Each of the sensor substrate 1 and the circuit substrate 2 can be a diced chip, but is not limited to the chip. For example, each substrate may be a wafer. Also, each substrate may be diced after stacked in a wafer state, or after chips are formed, the chips may be stacked and joined. In the sensor substrate 1, a pixel region 1a including the array of the SPADs 11 of the plurality of pixels 10 is arranged. In the circuit substrate 2, a circuit region 2a that processes a signal detected by the pixel region 1a is arranged. In the circuit region 2a, circuits 10' of the pixel 10 except the SPAD 11, for example, the TDC 20, the frequency divider 30, the signal generation circuit 40, the PLL circuit 50, the operation circuit 60, and the like are arranged.

An application example of the distance image sensor 100 will be described below. FIG. 17A shows an example of the configuration of an apparatus mounted on a vehicle as an in-vehicle camera. An apparatus 300 includes a distance measurement unit 303 and a collision determination unit 304. The distance measurement unit 303 is formed by the above-described distance image sensor 100, and measures the distance to a target. Distance information is information about the distance to the target, and the like. The collision determination unit 304 determines, based on the distance measured by the distance measurement unit 303, whether there is collision possibility.

The apparatus 300 is connected to a vehicle information acquisition device 310 and can acquire vehicle information such as a vehicle speed, a yaw rate, and a steering angle. Also, a control ECU 320 that is a control device configured to output, based on the determination result of the collision determination unit 304, a control signal for generating a braking force to the vehicle is connected to the apparatus 300. The apparatus 300 is also connected to a warning device 330 that generates a warning to the driver based on the determination result of the collision determination unit 304. For example, if collision possibility is high as the determination result of the collision determination unit 304, the control ECU 320 instructs the vehicle to actuate a brake, stop acceleration, and suppress the engine output, thereby avoiding collision and reducing damage. The warning device 330 issues a warning to the user via the output of a warning such as a sound, display of warning information on the screen of a car navigation system or the like, or the vibration of a seat belt and steering wheel. These devices of the apparatus 300 function as a moving body control unit that controls the operation of controlling the vehicle, as described above.

In this embodiment, the apparatus 300 performs distance measurement on the periphery, for example, on the front or rear side of the vehicle. FIG. 17B shows the apparatus in a case where distance measurement is performed on the front side of the vehicle (distance measurement range 350). The vehicle information acquisition device 310 serving as a distance measurement control means sends an instruction to the apparatus 300 or the distance measurement unit 303 to perform a distance measurement operation. With this configuration, the accuracy of distance measurement can further be improved.

Control of avoiding collision with another vehicle has been described above. However, this embodiment can also be applied to control of performing automated driving following another vehicle and control of performing automated driving while preventing deviation from a lane. Furthermore, the apparatus can be applied not only to a vehicle such as an automobile but also to, for example, a moving body (moving device) such as a ship, an aircraft, an artificial satellite, an industrial robot, or a consumer robot. In addition, the apparatus can be applied not only to the moving body but also to an apparatus that widely uses object recognition or biometric recognition, such as an intelligent transport system (ITS) or a monitoring system.

The present invention is not limited to the above embodiments and various changes and modifications can be made within the spirit and scope of the present invention. Therefore, to apprise the public of the scope of the present invention, the following claims are made.

According to the present disclosure, a technique advantageous in preventing a measurement error in a time to digital converter is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-170870, filed Sep. 29, 2023, which is hereby incorporated by reference herein in its entirety.

What is claimed is:

1. A time to digital conversion circuit comprising:
a first measurement block and one or a plurality of second measurement blocks,
wherein the first measurement block activates a control signal in accordance with activation of a start signal and measures time from the activation of the start signal to a first edge of a common clock signal,
the second measurement block includes a lower measurement circuit and an upper measurement circuit, which are enabled by the activation of the control signal, and
the lower measurement circuit measures time from activation of a stop signal to a second edge of the common clock signal, and the upper measurement circuit measures time from the first edge to the second edge.

2. The circuit according to claim 1, wherein
the first measurement block includes a first control circuit configured to activate the control signal in accordance with the activation of the start signal, and a measurement circuit configured to measure the time from the activation of the start signal to the first edge.

3. The circuit according to claim 2, wherein
the first control circuit outputs, as a second control signal, a signal obtained by synchronizing the control signal in accordance with the common clock signal,
the second measurement block includes a second control circuit, and
the second control circuit causes the upper measurement circuit to start measurement if the second control signal is activated next to the activation of the control signal, and
causes the lower measurement circuit to start measurement if the stop signal is activated in a state in which the control signal is activated.

4. The circuit according to claim 3, wherein
the second control circuit causes the upper measurement circuit to end the measurement in response to the second edge.

5. The circuit according to claim 3, wherein
the second control circuit causes the lower measurement circuit to end the measurement in response to the second edge.

6. The circuit according to claim 3, wherein
the first control circuit includes a first detection circuit configured to activate the control signal in asynchronism with the common clock signal in accordance with the activation of the start signal, and a second detection circuit configured to activate the second control signal in synchronism with the common clock signal in accordance with the activation of the control signal, and
the second detection circuit includes a first flip-flop configured to receive the control signal in response to a third edge of the common clock signal that arrives next to the activation of the control signal, and a second flip-flop configured to receive an output of the first flip-flop in response to a fourth edge of the common clock signal that arrives next to the third edge, thereby generating the second control signal.

7. The circuit according to claim 3, wherein
the second control circuit includes a third detection circuit configured to activate an output of itself in asynchronism with the common clock signal in accordance with the activation of the stop signal, and a fourth detection circuit configured to activate an output of itself in synchronism with the common clock signal in accordance with the activation of the output of the third detection circuit, and the fourth detection circuit includes a third flip-flop configured to receive the output of the third detection circuit in response to a fifth edge of the common clock signal that arrives next to the activation of the output of the third detection circuit, and a fourth flip-flop configured to receive an output of the third flip-flop in response to a sixth edge of the common clock signal that arrives next to the fifth edge, thereby updating an output of itself.

8. The circuit according to claim 1, wherein
the second measurement block has the same configuration as the first measurement block.

9. A distance measuring device comprising:
a pixel array including a plurality of pixels; and
a time to digital conversion circuit defined in claim 1,
wherein a plurality of second measurement blocks of the time to digital conversion circuit are arranged to receive a plurality of stop signals output from the pixel array.

10. The device according to claim 9, wherein
the plurality of pixels are arranged to form a plurality of rows and a plurality of columns, and
the plurality of second measurement blocks are provided in correspondence with the plurality of rows of the pixel array, respectively.

11. The device according to claim 9, wherein
the plurality of pixels are arranged to form a plurality of rows and a plurality of columns, and
the plurality of second measurement blocks are provided in correspondence with the plurality of pixels of the pixel array, respectively.

12. The device according to claim 9, wherein
the plurality of pixels are arranged to form a plurality of rows and a plurality of columns, and the plurality of pixels are divided into a plurality of groups, and
the plurality of second measurement blocks are provided in correspondence with the plurality of groups of the pixel array, respectively.

13. The device according to claim 9, wherein each of the plurality of pixels includes an avalanche photodiode.

14. The device according to claim 9, wherein each of the plurality of pixels includes an event detection type pixel.

15. The device according to claim 9, further comprising
a light-emitting unit; and
a control unit configured to send a light-emitting instruction to the light-emitting unit and send a start instruction to the time to digital conversion circuit.

16. A moving body comprising:
a distance measuring device defined in claim 9; and
a control unit configured to control the moving body based on an output of the distance measuring device.

* * * * *